United States Patent [19]

Fowler

[11] 4,348,166
[45] Sep. 7, 1982

[54] APPARATUS FOR FORMING THIN MATERIALS

[75] Inventor: David P. Fowler, Irving, Tex.

[73] Assignee: Frito-Lay, Inc., Dallas, Tex.

[21] Appl. No.: 195,938

[22] Filed: Oct. 10, 1980

[51] Int. Cl.$^3$ .......................... A21C 3/02; A21C 3/10
[52] U.S. Cl. ........................................ 425/310; 83/99;
83/100; 99/353; 99/427; 425/324.1; 425/328;
425/363; 425/388; 425/405 R; 425/436 R;
425/DIG. 60
[58] Field of Search ............... 264/157, 163, 335, 121;
425/238, 241, 289, 294, 296, 307, 310, 335, 363,
308, 387.1, 409, 437, 84, 85, 96, 101, 223, 224,
232, 315, 363, 365, 388, 503, 436, 438, 439;
426/391, 439, 446, 458, 464, 502, 503, 504, 512,
517, 83.1, 289–291, 496; 83/98–100; 99/352,
353, 354, 407, 426, 427

[56] References Cited

U.S. PATENT DOCUMENTS

| 807,420 | 12/1905 | Copeland | 425/289 |
|---|---|---|---|
| 1,003,368 | 9/1911 | Meirowsky | 425/83.1 |
| 1,519,985 | 12/1924 | Simmons | |
| 2,714,340 | 8/1955 | Brown | 425/335 |
| 2,786,673 | 3/1957 | Bridenstine | |
| 2,871,502 | 2/1959 | Whisnant | |
| 3,019,130 | 1/1962 | Hornbostel | |
| 3,060,775 | 10/1962 | Dreher | 83/100 |
| 3,073,008 | 1/1963 | McGraw | |
| 3,112,054 | 11/1963 | Fleissner | |
| 3,448,499 | 6/1969 | Czernin | |
| 3,541,974 | 11/1970 | Atkins | 425/241 |
| 3,590,748 | 7/1971 | Palmer | 425/363 |
| 3,872,752 | 3/1975 | Remde et al. | 83/100 |
| 3,911,805 | 10/1975 | Baird | 99/427 |
| 3,956,517 | 5/1976 | Curry et al. | 99/353 |

Primary Examiner—Willard E. Hoag
Attorney, Agent, or Firm—Bernard, Rothwell & Brown

[57] ABSTRACT

Apparatus for forming thin pieces of dough material are disclosed. Dough, e.g. masa, used in preparing chip-type food products, can be formed into a sheet, the sheet cut into the desired shaped pieces and the pieces removed from the sheeting and cutting operations and delivered for further processing and frying prior to packaging. The dough is delivered in bulk to a nip between two rolls where it is formed into a sheet as the dough passes between the rolls. Downstream of the nip the sheet is removed from one roll and adheres to the second roll which is engaged by a cutter. The removal is insured by the application of gas pressure from within the first roll. The resulting cut pieces of dough are removed from the second roll by the application of gas pressure from within the roll, and the cut pieces are thereby delivered to a take-away conveyor for passage to further processing and frying operations. In order to place the sheet on the second roll and subsequently deliver the cut pieces to the take-away conveyor, the rolls are configured to apply gas pressure at particular positions along the path of movement of the dough.

11 Claims, 1 Drawing Figure

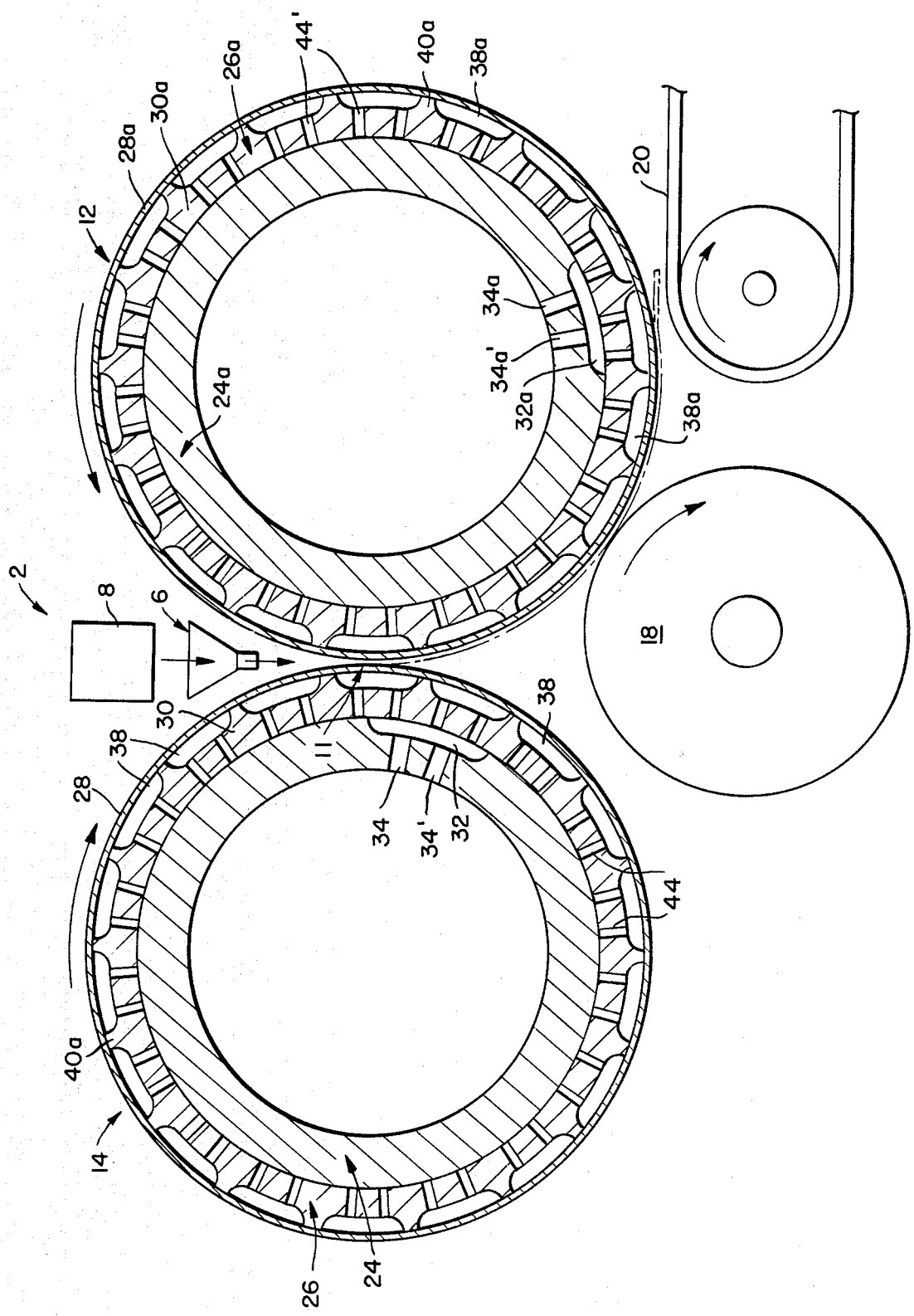

APPARATUS FOR FORMING THIN MATERIALS

BACKGROUND AND DISCUSSION OF THE INVENTION

In the preparation of chip-type snack products a thin sheet of dough, called masa in the case of corn products, is formed and cut into smaller bite-size pieces of desired configuration. The cut pieces are delivered to further processing and a frying process where the dough is typically fried in oil. Food products which can be manufactured in this manner include fabricated potato chips and chips derived from grain sources such as corn chips.

One problem which has existed in the use of rollers to form and cut thin masa pieces prior to the invention described herein resulted from the configuration of the rolls. Convex-concave roll configurations have been used in conjunction with stripper wires to form the sheet material, strip it from one roll and place it on another. Current practice in masa sheeting has employed a primary roll which is concave throughout the periphery of the surface of the roll and along a substantial portion of the length of the roll between the roll ends. The secondary roll is convex throughout the same portion of the roll and complementary to the concave portion of the primary roll so that the rolls can form a nip of constant thickness when aligned in close proximity to one another for forming sheet material. Similarly, the cutter is convex for engaging the primary roll at a position displaced from the secondary roll to cut the sheet formed between the two rolls, stripped from the secondary roll and delivered to the primary roll.

The convex-concave configuration was apparently adopted to maintain the wires in a taught disposition across the entire length of the roll, particularly for the secondary roll which is convex. When using wires to strip the sheet masa from the secondary roll, not only will they break and cause interruption of the production since the sheeter has to be shut down to replace the broken wire, but bands and grooves are employed for aiding in holding the stripper wire to the primary roll surface since the primary roll is concave. Bands and wires on the primary roll also break and cause production to be interrupted.

The cutting pattern typically employed is one in which the cut pieces may be contiguous to adjacent pieces in which case there is no waste dough or trim between the pieces for separation and reuse or other disposition. This type of cutting is referred to herein as full pattern cutting. The grooves and bands reduce the effective or useable width of the rolls particularly on "full pattern cutting."

In the preferred embodiment stripping of the sheet from the first roll so that the sheet always adheres to the second roll is insured by the manner of constructing the rolls. Thus each of the sheet-forming rolls is constructed so that gas pressure can be applied beneath the adjacent dough on the surface of the roll at an appropriate location on the path of the periphery of the roll. Thus, the sheet-forming rolls of the invention are rotated in opposite directions at approximately the same speed and deliver the dough in sheet form for cutting into smaller, sometimes contiguous pieces. The forming rolls are internally pressurized, and at designated points along the periphery, the pressure is used to force the dough sheet from a first of the rolls and to adhere to the other roll, herein referred to as the second roll, for contact with a cutting roll. Subsequently, the cut dough pieces are stripped from the second roll by a similarly selective application of gas pressure from within the roll. The cut pieces may become positioned on a conveyor and can be delivered to further processing and a frying operation. This technique avoids the use of the conventional stripping wires which frequently break and cause processing interruptions.

By employing a cylindrical configuration instead of the concave-convex rolls of commercial machines a shape which is easier and cheaper to manufacture can be employed. The axial positioning of the rolls in the cutter is not critical as it is for concave and convex rolls and cutters where differential speeds between the cutter and other rolls may result from improper alignment. Otherwise, there would be greater wear since slipping, rather than true rolling action, may exist. Thus, longer wear and longer useful life result for the cutter and primary roll of the invention. By eliminating the convex and concave configurations, and their accompanying grooves, wires and bands, a greater area of the rolls is available for production, e.g., a $16\frac{2}{3}\%$ increase assuming both machines operate at the same roll speed and are of the same length.

The rolls are characterized by an internal, non-rotating inner cylinder which can be internally pressurized with gas. This inner cylinder has a plenum trough extending axially along its outer surface, and the trough is connected to the hollow center of the roll by an axially-extending row of radial holes. A second cylindrical member whose inside surface fits closely about the outer periphery of the non-rotating cylinder, rotates about the latter cylinder. On its outer periphery the rotating cylinder is equipped with a multiplicity of peripherally spaced-apart, axially-extending troughs connected by axially positioned rows of holes to its inner surface which is contiguous with the outer surface of the non-rotating cylinder.

In this way the pressure in a first of the sheet forming rolls can be concentrated at a position that is more or less immediately downstream of the nip of the rolls where the sheet is formed, and thereby force the sheet against the other sheet-forming roll. The latter roll is adjacent a full-pattern cutting roll which cuts the dough sheet into pieces of desired size and shape. The cut pieces remain adhered to the roll. Pressure in the second sheet-forming roll is concentrated a short peripheral distance from the point of contact with the cutting roll to force the cut pieces off the second sheet-forming roll and toward the take-away conveyor. The pieces are then transported to other treatments such as toasting, conditioning and frying.

Details of the rolls in conjunction with the system to form the sheet are shown in the drawing which is a schematic vertical cross-section of an apparatus of the invention.

DETAILED DESCRIPTION OF THE PREFERRED EMBODIMENT

Before discussing the detailed features of the form of the invention shown in the drawing it may be helpful to discuss briefly the operation of the system. In this way the interrelationship of the various elements and their advantages within the system may be better appreciated.

The materials 2 for forming the dough are initially delivered to a dough-forming apparatus 8 as shown schematically in the drawing. The amount of moisture in the dough is controlled to insure that there is sufficient cohesiveness to allow the dough to be formed into the chip products while the adhesiveness is not so great as to prevent the dough from unduly sticking to surfaces or, otherwise, adversely impeding the operation of the machinery. After the dough is formed, it is delivered to a nozzle 6 immediately above nip 11 of the primary sheet-forming roll 12 and second sheet-forming roll 14. Roll 14 rotates in a clockwise direction and roll 12 runs in the counter-clockwise direction in order to form the dough sheet therebetween. The minimum spacing between the rolls determines the thickness of the formed dough sheet. Suitable thickness are often about 0.01 to 0.1 inch, preferably about 0.015 to 0.070 inch. The rolls are circular in cross-section Downstream of and below the nip of the rolls while the sheet material is adhered to the outer surface of the primary roll 12 a cutter roll 18 engages the sheet material to cut it in the desired configuration. After the cutting step the pieces of cut material are transferred to a take-away conveyor 20 for delivery to a frying vessel. The present invention concerns the manner in which adherence of the dough sheet to roll 12 and removal of the cut pieces from this roll, are accomplished through selective gas pressuring.

The primary roll 12 and the secondary roll 14 are similar in configuration with the major difference being in the location of various elements employed to apply pressure at a preselected position on their periphery. To avoid redundancy, one of the rolls will be described in detail with the other roll being discussed only in connection with the deviations from the first roll.

The secondary roll 14 includes a stationary, non-rotating hollow cylinder 24 about which rotates an outer two-part cylinder 26. The stationary cylinder 24 provides a source of pressurized air or other convenient gas which is passed through one or more rows of holes such as 34 and 34' positioned just below nip 11 to direct the gas beneath the sheet emanating from nip 11 of the rolls 12 and 14 force the sheet to the surface of primary roll 12. The rows of holes 34 and 34' extend horizontally or axially for more or less the full length of cylinder 24. The rotating outer cylinder 26 is configured to cooperate with the inner cylinder such that the gas pressure is only applied immediately downstream of nip 11.

The stationary, non-rotating hollow cylinder 24 includes a plenum or trough 32 formed by a recess in the exterior surface of the stationary cylinder. Trough 32 extends axially or horizontally for more or less the full length of cylinder 24, except that the ends of the trough are sealed to prevent loss of gas pressure. The peripheral width or circumferential bounds of this recess extend relative to the path of movement of the sheet from the nip of the roll through a small portion of the circumference of cylinder 24, say an arc of approximately 25° to 40°; in the direction of movement of the sheet material. As noted, the length of the trough 32 extends substantially the entire length of the cylinder. This trough is connected to the internal or hollow portion of the cylinder by one or more rows of gas outlets such as 34 and 34'. As can be seen in the drawing the trough is in continuous communication with pressurized gas within the central hollow portion of cylinder 24.

The outer or rotating cylinder 26 of roll 14 includes two parts, an outer porous cover 28 which completely circumscribes the cylinder and is substantially continuous, and an inner backing 30 which provides access for the pressurized air to the porous cover 28 as it is rotated past trough 32. On the outer periphery of the inner backing 30, a multiplicity of closely spaced-apart, outer troughs 38 are equally positioned about the entire circumference of backing member 30. The troughs 38 are separated from one another by projections 40 on member 30, such that pressurized air provided to a trough will be limited to that trough and thus isolated from adjacent troughs. Projections 40 and troughs 38 extend horizontally or axially more or less the full length of the roll, except that the ends of troughs 38 are closed to prevent loss of gas pressure in such directions. Rows of equally spaced holes 44 extending radially between the inner surface of backing 30 and the troughs 38 provide gas passages to the troughs and ultimately through the porous cover 28. As shown, the circumferential width of each trough 38 is sufficient to accommodate one or more, circumferentially-spaced rows of holes 44, and each row of holes extends more or less the full length of member 30.

With this configuration a given portion of outer porous cover 28 only receives pressurized gas as the respective rows of holes 44 are communicated with the inner trough 32 as the outer cover is rotated past the inner trough. Because of the location of the inner trough 32, the pressurized gas only passes through the outer porous cover 28 when a given portion is at a location immediately downstream of the nip of the rolls. As outer troughs 38 are rotated past nip 11 of the rolls 12 and 14, the rows of holes 44 in a give trough 38 will come into communication with the inner trough 32. During movement past inner trough 32 the pressurized gas passes into an outer trough 38, and gas pressure is applied beneath the dough sheet in that vicinity to force the sheet against the primary roll 12 as shown in the drawing. Because the remaining portions of the backing member are not in communication with trough 32 nor pressurized gas, there is no pressure imposed on the dough while it is disposed above the nip of the roll. Once a given outer trough 38 has passed the inner trough 32 the gas access and, therefore, the pressure ceases for that particular trough. However, subsequent troughs 38 are pressurized in the same manner such that the sheet is continuously subjected to pressurized gas downstream of nip 11.

In this manner the outer rotating member 28 on each roll provides a path for the pressurized air from the inner member while at the same time providing a moving support for the dough sheet. Thus, the sheet is pressurized only when the plenum of the non-rotating member 24 is in gas communication with a given portion of the surface of the outer cover 28 at the specified location immediately downstream of nip 11. The outer cover 28 is formed of a strong, porous material which allows air or gas to pass readily through the ring and lift dough sheet off cover 28.

A suitable material of construction for cover 28 is metallic, e.g. stainless steel, and the cover may be a type of material sometimes referred to as porous metal. Such materials of desired porosity and given permeability characteristics are known, and gas passing through such materials is released more or less uniformily from the surface of the metal; in the present invention this is the outer surface of cover 28. The porous metal structures can be made by sintering powdered metal as known in the art or by weaving, calendaring and sintering metallic wires. Manufactures of such materials of controlled porosity are the Mott Metallurgical Corporation of Farmington, Conn., and Michigan Dynamics Division, Ambac Industries, Inc., Garden City, Mich.

The primary roll 12 includes troughs 32a, rows of air outlet holes 34a and 34a', inner backing 30a, rows of air passages 44', outer troughs 38a and outer porous cover 28a, similar to the corresponding parts in the secondary roll 14. However, the inner trough 32a is located downstream of nip 11 a distance sufficient for the sheet on roll 12 to be cut into pieces before reaching the location opposite trough 32a. In the drawing this distance is approximately one-fourth of a revolution of outer cover 28a. When a given portion of outer cover 28a is opposite trough 32a, gas pressure is applied beneath the cut dough pieces on roll 14 to transfer them to the takeaway conveyor 20. As with the secondary roll, the dough on cover 28a will only be subjected to positive gas pressure in the selected position of the inner trough 32a of the primary roll 14.

Intermediate the locations of troughs 32 and 32a, the cutter roll 18 cuts the dough sheet formed on primary roll 12 to the desired configuration. Any waste material or trim can be removed from the primary roll 14 in a desired manner. For example, the trim may be removed on the cutter roll by the action of a correspondingly selected pattern of negative pressure or vacuum on the cutter roll, or a selected pattern of positive gas pressure directed only beneath the waste material on the primary roll. Although it is not shown in the drawings, the positive pressure can be applied in a manner similar to that discussed in connection with the primary and secondary rolls herein, but at a location between cutter roll 18 and the location of trough 32a. By providing gas access holes and appropriately shaped troughs in member 24a and 26a, the pressure would be limited by the configuration of the troughs only to the waste material. The positions of the cut dough pieces on cover 28a would not be affected.

It has been described earlier herein that porous metal is used in the outer periphery of the rolls to allow pressurization of the sheet masa formed thereon. Prior to the use of such rolls, both the primary and secondary rolls were precision machined dough contact surfaces sandblasted to provide a satin finish needed for proper adhesion. The porous metal has a natural satin (unpolished) finish which does not require such blasting and therefore reduces the cost of manufacturing of the machine while enhancing its operation.

In the case of non-contiguous shaped pieces, e.g. circles or ellipses, the porous surface 28a could be masked in appropriate areas with a pore filling sealant material which would permit the lace or trim (sheeted dough between desired shapes) to remain on the porous surface 28a and be returned to the region above the nip 11 for recycling. Also, the rolls as shown and described above have a constant circular cross-section throughout the length of the roll. Although this configuration is highly preferred and has functional and manufacturing advantages, the cross-section could vary along the length of the roll if the specific use so required.

Although the above has been a detailed discussion of the preferred embodiment, the present invention is not limited to that embodiment.

It is claimed:

1. An apparatus suitable for forming sheet dough material comprising a first rotatable roll and a second rotatable roll positioned to provide a sheet-forming nip therebetween, means for delivering dough for sheeting and cutting to said nip, each of said rolls having means for providing elevated gas pressure from within to the periphery of the roll, said first roll having means for selectively applying pressurized gas from within the roll to its periphery immediately downstream of said nip and positioning the formed sheet on said second roll, cutting means downstream of said nip for cutting the sheet on said second roll into pieces, said second roll having means for selectively applying pressurized gas from within the roll to its periphery downstream of said cutting means to force said pieces away from the outer surface of said second roll.

2. The apparatus according to claim 1 wherein at least one of said rolls include a stationary cylinder, a rotatable cylinder rotatable around said stationary cylinder, communication means providing communication for gas through a selected portion of the periphery of said stationary cylinder to the inner surface of said rotatable cylinder along its axial length, said rotatable cylinder having a plurality of circumferentially spaced-apart means extending along the axial length of said rotatable cylinder for sequentially communicating with said communication means of said stationary cylinder when the rotatable cylinder moves around the stationary cylinder, said circumferentially spaced-apart means of said rotatable cylinder providing gas communication from the inner surface to the outer surface of said rotatable cylinder.

3. The apparatus according to claim 1 wherein each of said first and second rolls includes a stationary cylinder, a rotatable cylinder rotatable around said stationary cylinder, communication means providing communication for gas through a selected portion of the periphery of said stationary cylinder to the inner surface of said rotatable cylinder along its axial length, said rotatable cylinder having a plurality of circumferentially spaced-apart means extending along the axial length of said rotatable cylinder for sequentially communicating with said communication means of said stationary cylinder when the rotatable cylinder moves around the stationary cylinder, said circumferentially spaced-apart means of said rotatable cylinder providing gas communication from the inner surface to the outer surface of said rotatable cylinder.

4. The apparatus according to claim 1, 2 or 3 wherein said communication means of said stationary cylinder is of sufficient peripheral width for maintaining gas communication with at least two adjacent ones of said circumferentially spaced-apart means in said rotatable cylinder when said rotatable cylinder rotates around said stationary cylinder.

5. The apparatus according to claim 1, 2 or 3 when in at least the outer surface of said rotatable cylinder is circular in cross-section and substantially constant throughout the cylinder length.

6. The apparatus according to claim 1, 2 or 3 wherein said stationary cylinder includes a chamber for pressurized gas and said communication means includes a recess extending circumferentially over an arc on the outer surface of said stationary cylinder, said recess being in gas communication with said chamber and with said circumferentially spaced-apart means in said rotatable cylinder upon rotation past said recess.

7. The apparatus according to claim 6 wherein the arc of said recess in said stationary cylinder is sufficient for said recess to communicate simultaneously with adjacent ones of said circumferentially spaced-apart means of said rotatable cylinder when it rotates around said stationary cylinder.

8. The apparatus according to claim 7 wherein said circumferentially spaced-apart means in said rotatable cylinder include radial holes opening to the inner surface of said rotatable cylinder and extending at least partially through said rotatable cylinder, and said rotatable cylinder further including an outer cover of porous material in gas communication with said recess and being sufficiently porous to allow gas to pass therethrough.

9. The apparatus according to claim 8 wherein said rotatable cylinder includes the outer porous cover and an inner backing, said inner backing having said holes spaced about the circumference thereof to communicate with the recess in said stationary chamber when rotated past said stationary cylinder to provide gas communication to the surface of said rotatable cylinder.

10. The apparatus according to claim 9 wherein the inner backing of said rotatable cylinder includes as said circumferentially spaced-apart means a plurality of troughs positioned around the circumference of said inner backing in communication with the porous cover and correspondingly positioned ones of said holes in said inner backing, said troughs extending axially along said inner backing, and said troughs being separate from one another whereby pressurized gas delivered to a trough from said recess in said stationary cylinder through said holes in said inner backing can pass through the portion of the outer periphery of the rotatable cylinder bounded by said trough.

11. The apparatus according to claim 10 wherein said recess in said stationary cylinder is of sufficient peripheral width for maintaining gas communication with said holes in said rotatable cylinder in communication with at least two adjacent troughs in said rotatable cylinder when said rotatable cylinder rotates around said stationary cylinder.

* * * * *